US008576429B2

(12) United States Patent
Anezaki et al.

(10) Patent No.: US 8,576,429 B2
(45) Date of Patent: Nov. 5, 2013

(54) IMAGE FORMING SYSTEM, INFORMATION PROCESSING APPARATUS, DOCUMENT PROCESSING METHOD AND PRINTER DRIVER FOR VIEWING IN AN IMAGE FORMING APPARATUS

(75) Inventors: Kazuya Anezaki, Amagasaki (JP);
Minako Kobayashi, Ikeda (JP);
Takehisa Yamaguchi, Ikoma (JP);
Katsuhiko Akita, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 653 days.

(21) Appl. No.: 12/758,938

(22) Filed: Apr. 13, 2010

(65) Prior Publication Data

US 2010/0265544 A1 Oct. 21, 2010

(30) Foreign Application Priority Data

Apr. 21, 2009 (JP) ................................ 2009-103481

(51) Int. Cl.
*G06F 3/12* (2006.01)

(52) U.S. Cl.
USPC ........ 358/1.15; 358/1.13; 358/1.14; 715/274; 709/219

(58) Field of Classification Search
USPC ......... 358/1.13, 1.14, 1.15; 715/274; 709/219
See application file for complete search history.

(56) References Cited

U.S. PATENT DOCUMENTS

| 2001/0029521 | A1 | 10/2001 | Matsuda et al. | |
|---|---|---|---|---|
| 2002/0035585 | A1* | 3/2002 | Noda | 707/527 |
| 2007/0046970 | A1 | 3/2007 | Yokobori et al. | |
| 2007/0273925 | A1* | 11/2007 | Hong | 358/1.16 |
| 2008/0170259 | A1* | 7/2008 | Koshika et al. | 358/1.15 |
| 2008/0259390 | A1 | 10/2008 | Murase | |

FOREIGN PATENT DOCUMENTS

| EP | 1 143 695 | A2 | 10/2001 | |
|---|---|---|---|---|
| EP | 1143695 | A2 * | 10/2001 | H04N 1/00 |
| EP | 1 860 547 | A2 | 11/2007 | |
| JP | 2002-215354 | | 8/2002 | |

(Continued)

OTHER PUBLICATIONS

Office Action (Notification of Reasons for Refusal) dated Apr. 26, 2011, issued in the corresponding Japanese Patent Application No. 2009-103481, and an English Translation thereof.

(Continued)

*Primary Examiner* — Jacky X Zheng
(74) *Attorney, Agent, or Firm* — Buchanan Ingersoll & Rooney PC

(57) ABSTRACT

When a user activates a printer driver recorded in a memory of an information processing apparatus, a setting screen to configure operation setting for the printer driver's matching image forming apparatus is displayed on a display of the information processing apparatus, and in the setting screen, an instruction portion to give an instruction to show the documents stored in a memory area of the image forming apparatus is shown. And when the user gives an instruction by using the instruction portion, a request to show the documents is transmitted to the image forming apparatus. Receiving the request, the image forming apparatus returns to the information processing apparatus, reference information to select a document among those stored in the memory area. And then, a selection screen to select a document among those stored therein is displayed on the display, based on the reference information received from the image forming apparatus.

26 Claims, 15 Drawing Sheets

(56) References Cited

FOREIGN PATENT DOCUMENTS

| | | |
|---|---|---|
| JP | 2002-354164 | 12/2002 |
| JP | 2005-174052 A | 6/2005 |
| JP | 2006-085627 | 3/2006 |
| JP | 2006-137148 | 6/2006 |
| JP | 2006-228011 A | 8/2006 |
| JP | 2007-067685 | 3/2007 |
| JP | 2008-226119 | 9/2008 |
| JP | 2008-269058 | 11/2008 |

OTHER PUBLICATIONS

Search Report dated Jul. 28, 2011, issued in the corresponding European Patent Application No. 10160145.8.

Office Action (Notification of Reasons for Refusal) dated Sep. 20, 2011, issued in the corresponding Japanese Patent Application No. 2009-103481, and an English Translation thereof.

\* cited by examiner

IMAGE FORMING SYSTEM, INFORMATION PROCESSING APPARATUS, DOCUMENT PROCESSING METHOD AND PRINTER DRIVER FOR VIEWING IN AN IMAGE FORMING APPARATUS

This application claims priority under 35 U.S.C. §119 to Japanese Patent Application No. 2009-103481 filed on Apr. 21, 2009, the entire disclosure of which is incorporated herein by reference in its entirety.

BACKGROUND OF THE INVENTION

1. Field of the Invention

The present invention relates to an image forming system in which an information processing apparatus such as a personal computer and an image forming apparatus are capable of being interconnected via a network; an information processing apparatus preferably employed in this image forming system; a document processing method implemented by this image forming system; and a printer driver recorded in a computer readable recording medium to make a computer execute processing.

2. Description of the Related Art

The following description sets forth the inventor's knowledge of related art and problems therein and should not be construed as an admission of knowledge in the prior art.

The MFPs (Multi Function Peripherals) such as multifunctional digital image forming apparatuses collectively having a plurality of functions: the copy function, the print function, the scan function, the facsimile function and other functions, are supposed to hold one or more than one memory area that is referred to as "Box", in a recording medium such as a hard disk drive, and store in this memory area, various documents: readout documents, documents received by facsimile and other documents. The BOX may be a personal BOX that can be accessed by an individual user or a shared BOX that can be accessed arbitrarily by a plurality of users, for example members of a group.

And various technologies have been suggested to allow users to view the documents stored in a shared BOX by operating their own information processing apparatuses.

There is a known technology that allows users to access a BOX and give an instruction to print a document stored in the BOX via a utility tool installed and activated on their terminal apparatuses, specifically a Web browser installed on their terminal apparatuses using the Web server function of the MFP, for example.

Furthermore, according to Japanese Unexamined Laid-open Patent Publication No. 2006-228011, there is a technology that stores in a print apparatus, print job data previously having been used for printing a document, and then outputs the print job data when an instruction to re-print the same document is given. This could make the re-print operation performed smoothly.

However, the conventional technologies to view the documents stored in a BOX of the image forming apparatus by operating the terminal apparatus, require a particular operation that is not familiar to ordinary users, thus they would need early training and time to learn it enough. This is inconvenient.

And Japanese Unexamined Laid-open Patent Publication No. 2006-228011 does not provide a perfect solution to resolve the problem described above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image forming system that allows users to view the documents stored in a memory area (Box) of an image forming apparatus in a simple manner, by operating their terminal apparatuses.

It is another object of the present invention to provide an information processing apparatus that is preferably employed in the image forming system.

It is yet another object of the present invention to provide a document processing method that is implemented in the image forming system.

It is still yet another object of the present invention to provide a printer driver that is used in the image forming system.

According to a first aspect of the present invention, an image forming system includes an information processing apparatus and an image forming apparatus that are capable of being interconnected via a network, and wherein: the information processing apparatus includes:
  a memory that records in itself, a printer driver to configure operation setting for an
  image forming apparatus that holds one or more than one memory area capable of storing a document;
  a display;
  a controller that makes the display show a setting screen to specify operation settings for the image forming apparatus that matches the printer driver recorded in the memory, when the printer driver is activated, and further makes the display show in the setting screen, an instruction portion to give an instruction to show the documents stored in a memory area of the image forming apparatus; and
  a transmitter that transmits a request to show the documents stored therein to the image forming apparatus, when the instruction portion is used by user,
the image forming apparatus includes:
  a receiver that receives the request from the information processing apparatus; and
  a transmitter that transmits to the information processing apparatus, reference information to select a document among those stored therein, in response to the request received by the receiver, and
the controller of the information processing apparatus further makes the display show a selection screen to select a document among those stored therein based on the reference information received from the image forming apparatus.

According to a second aspect of the present invention, an information processing apparatus capable of being connected to an image forming apparatus via a network, includes:
  a memory that records in itself, a printer driver to configure operation setting for an image forming apparatus that holds one or more than one memory area capable of storing a document;
  a display;
  a controller that makes the display show a setting screen to specify operation settings for the image forming apparatus that matches the printer driver recorded in the memory, when the printer driver is activated, and further makes the display show in the setting screen, an instruction portion to give an instruction to show the documents stored in a memory area of the image forming apparatus;

a transmitter that transmits a request to show the documents stored therein to the image forming apparatus, when the instruction portion is used by user; and a receiver that receives reference information to select a document among those stored therein, which is returned from the image forming apparatus in response to the request, and wherein:

the controller of the information processing apparatus further makes the display show a selection screen to select a document among those stored therein based on the reference information received from the image forming apparatus.

According to a third aspect of the present invention, a document processing method implemented by an image forming system in which an information processing apparatus and an image forming apparatus are capable of being interconnected via a network, includes:

the information processing apparatus's:

making a display show a setting screen to specify operation settings for an image forming apparatus that holds one or more than one memory area capable of storing a document, when a printer driver for the image forming apparatus is activated, and further making the display show in the setting screen, an instruction portion to give an instruction to show the documents stored in a memory area of the image forming apparatus; and transmitting a request to show the documents stored therein to the image forming apparatus, when the instruction portion is used by user, and the image forming apparatus's:

receiving the request from the information processing apparatus; and transmitting to the information processing apparatus, reference information to select a document among those stored therein, in response to the received request, and wherein:

a selection screen to select a document among those stored therein is further displayed on the display based on the reference information received from the image forming apparatus.

According to a fourth aspect of the present invention, a printer driver to configure operation setting for an image forming apparatus that holds one or more than one memory area capable of storing a document, is recorded in a computer readable recording medium to make a computer of an information processing apparatus, execute:

making a display show a setting screen to specify operation settings and further making the display show in the setting screen, an instruction portion to give an instruction to show the documents stored in a memory area of the image forming apparatus;

transmitting a request to show the documents stored therein to the image forming apparatus, when the instruction portion is used by user;

receiving reference information to select a document among those stored therein, returned from the image forming apparatus in response to the request; and making the display show a selection screen to select a document among those stored therein based on the received reference information.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
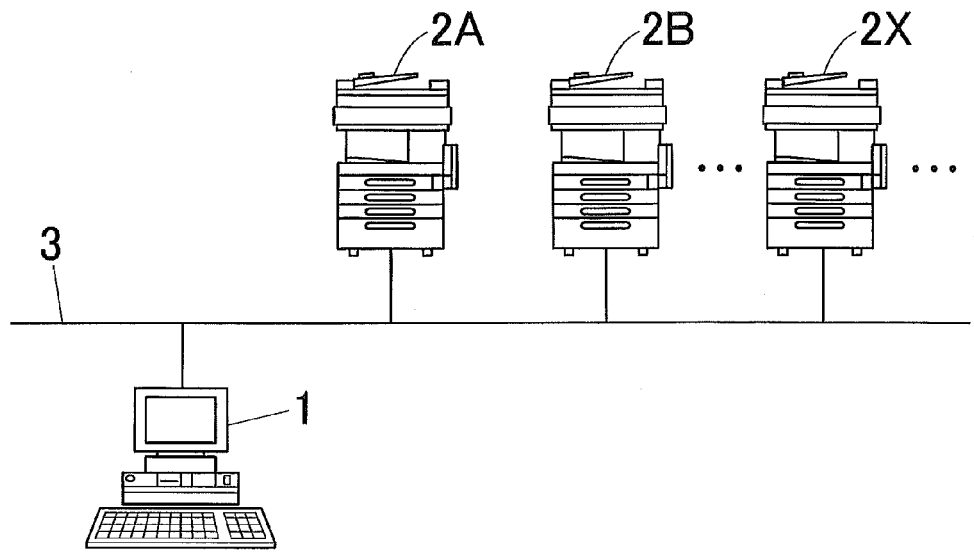
FIG. 1 is a block diagram schematically showing a configuration of an image forming system according to one embodiment of the present invention.

FIG. 1 is a block diagram schematically showing a configuration of an image forming system according to one embodiment of the present invention.

This image forming system includes a terminal apparatus 1 employed as an information processing apparatus and one or more than one image forming apparatus from image forming apparatuses 2A, 2B . . . and 2X. And the terminal apparatus 1 and the image forming apparatuses 2A, 2B . . . and 2X are interconnected via a network 3.

Figure 2:
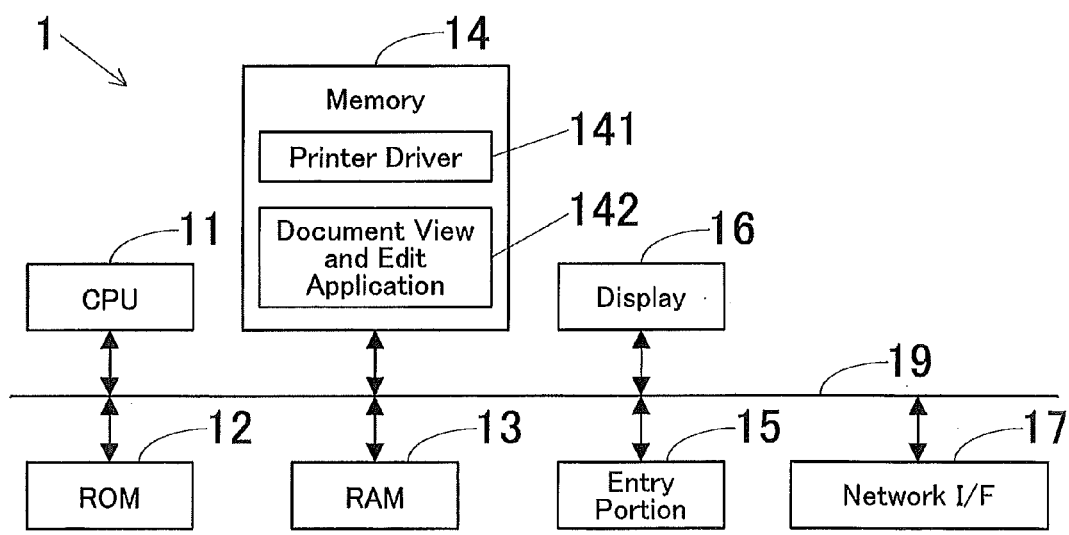
FIG. 2 is a block diagram schematically showing a configuration of a terminal apparatus that is employed in the image forming system of FIG. 1.

FIG. 2 is a block diagram schematically showing a configuration of the terminal apparatus 1 that is employed in the image forming system of FIG. 1.

In this embodiment, the terminal apparatus 2 is a personal computer, and includes a CPU 11, a ROM 12, a RAM 13, a memory 14, an entry portion 15, a display 16, a network interface (Network I/F) 17 and etc., and these are interconnected via a system bus 19.

The CPU 11 centrally controls the entire terminal apparatus 1 by executing a program stored in the ROM 12 or the memory 14.

The ROM 12 is a recording medium that stores in itself a program executed by the CPU 11, and other data.

The RAM 13 is a recording medium that provides a work area for the CPU 11 to execute processing according to an operation program.

The memory 14 is a recording medium such as a hard disk drive (HDD), and stores in itself various application programs, data and etc. In this embodiment, the memory 14 stores a printer driver 141 as driver software for at least one of the image forming apparatuses 2A, 2B . . . and 2X. By executing this printer driver, the CPU 11 can make the printer driver's matching image forming apparatus perform printing, for example. Furthermore, in this embodiment, the printer driver 141 serves to transmit to the printer driver's matching image forming apparatuses 2A, 2B . . . or 2X, a request to show the documents stored in a BOX thereof, to be described later. This will be further explained.

In addition to the printer driver 141, the memory 14 further stores in itself, document view and edit applications 142 such as "Word" of Microsoft Inc. and so-called "memo pad", and other software (programs).

The entry portion 15 includes a keyboard, a mouse and etc., and servers for user entry operation.

The display 16 is a CRT, a liquid crystal display or etc., and displays on itself, a print setting screen, various messages, an entry accepting screen, a selection screen and other screens according to the printer driver, and also documents and etc. created by users.

The network interface 17 functions as a communicator that exchanges data with the image forming apparatuses 2A, 2B . . . and 2X, and other external apparatuses, via the network 3. In this embodiment, the network interface 17 transmits print settings and an instruction entered and given via a print setting screen that is displayed according to the printer driver, to the printer driver's matching image forming apparatuses 2A, 2B . . . or 2X.

Figure 3:
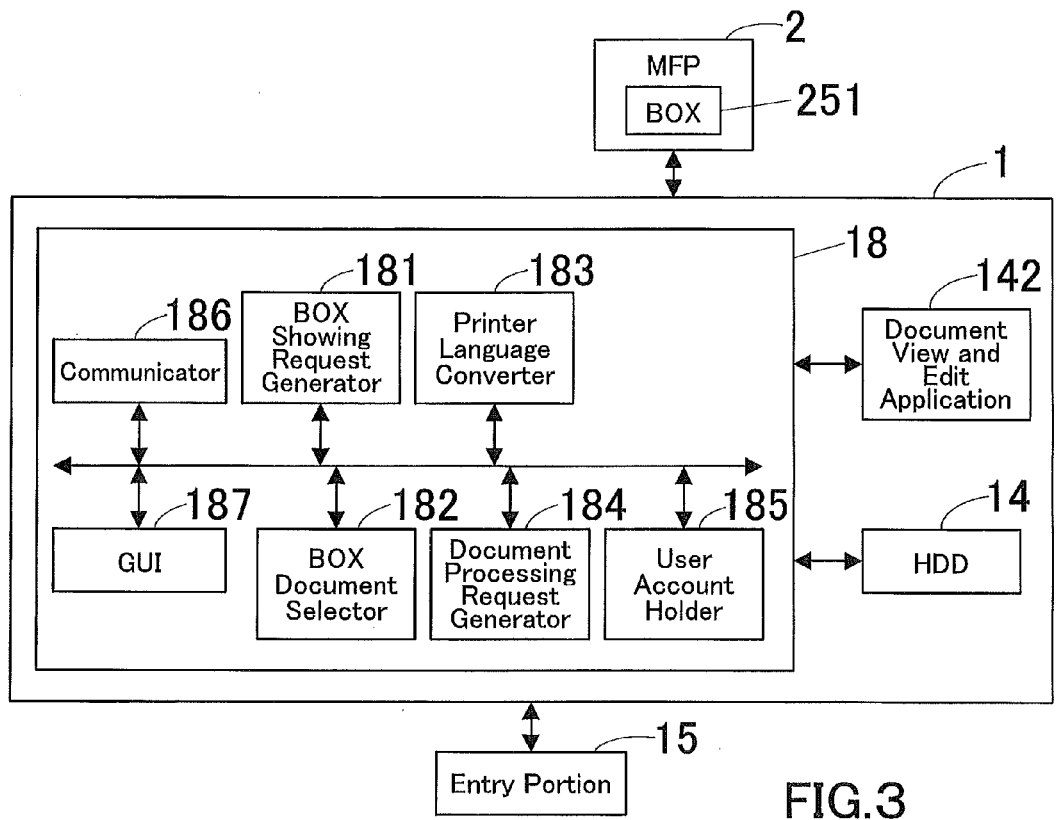
FIG. 3 is a block diagram showing functions of a printer driver recorded in a memory.

FIG. 3 is a block diagram showing a functional configuration of the printer driver recorded in the memory 14.

No. 18 is given to a functional portion having the functions of the printer driver. The functional portion 18 includes a BOX showing request generator 181, a BOX document selector 182, a printer language converter 183, a document processing command generator 184, a user account holder 185, a communicator 186 and a GUI (Graphical User Interface) 187.

A user gives a BOX showing instruction via a print setting screen, then the BOX showing request generator 181 generates a BOX showing request to be transmitted to the printer driver's matching image forming apparatus 2A, 2B . . . or 2X. "Box showing" means "show the documents stored in a Box", in other words, showing the documents stored in a BOX thereof. The generated BOX showing request is transmitted to the printer driver's image forming apparatus 2A, 2B . . . or 2X, by the communicator 186.

The BOX document selector 182 accepts a user's selected document among a list of the documents stored in a BOX transmitted from the image forming apparatus 2A, 2B . . . or 2X in response to the BOX showing request, and a user's given instruction to process the document. Furthermore, the BOX document selector 182 performs necessary operations according to user operation.

The printer language converter 183 converts a document created on the terminal apparatus 1 into a printer language so that an image forming apparatus could print the document.

The document processing command generator 184 generates print settings such as number of sets, paper size and whether or not to punch and generates a print request, according to user operation.

The user account holder 185 holds in itself, authentication information (user accounts) for users to log in the printer driver's matching image forming apparatus 2A, 2B . . . or 2X.

The communicator 186 communicates with the printer driver's matching image forming apparatus 2A, 2B . . . or 2X, and thereby transmits to the image forming apparatus, account information; setting information such as print settings; a print request; a BOX showing request; and other information, and also receives therefrom information of the Boxes thereof, information of the documents stored in the Boxes and other information.

The GUI 187 serves to graphically display on the display 16, a print setting screen, lower screens of the print setting screen and other screens, according to user operation.

Figure 4:
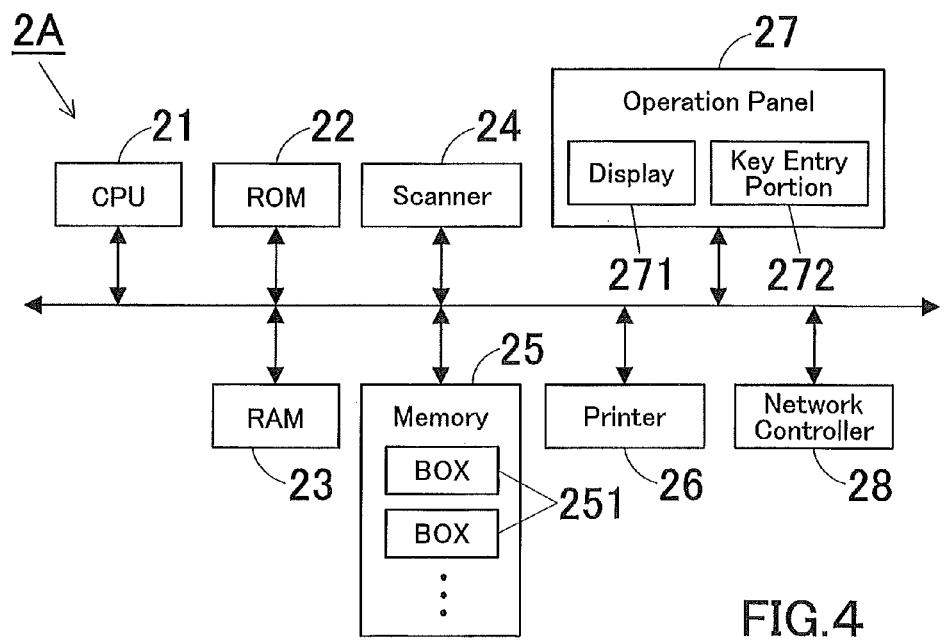
FIG. 4 is a block diagram showing a configuration of an image forming apparatus.

FIG. 4 is a block diagram showing a configuration of the image forming apparatuses 2A, 2B . . . and 2X. Since these image forming apparatuses have a common configuration, a configuration of the image forming apparatus 2A will be explained hereinafter, on behalf of them.

A MFP just like that described above, is employed as the image forming apparatus 2A. In the following description, image forming apparatuses may be simply referred to as "MFPs".

The MFP 2A includes a CPU 21, a ROM 22, a RAM 23, a scanner 24, a memory 25, a printer 26, an operation panel 27, a network controller (NIC) 28 and etc.

The CPU 21 centrally controls the entire image forming apparatus 2A. Furthermore, in this embodiment, the CPU 21 performs operations in response to a request from the terminal apparatus 1, for example transmitting to the terminal apparatus 1, information of the Boxes held in the image forming apparatus 2A and information of the documents stored in the Boxes.

The ROM 22 is a memory that stores in itself an operation program for the CPU 21, and other data.

The RAM 23 is a memory that provides a work area for the CPU 21 to execute processing according to an operation program.

The scanner 24 is a reader that reads an image of a document placed on a document table (not shown in Figures) and outputs image data obtained from the document.

The memory 25 is a nonvolatile recording device, for example a hard disk drive (HDD). This memory 25 holds in itself a plurality of Boxes 251 that correspond to directories that are memory segments to classify and record data. Image data read out from a document by the scanner 24, data received from the other image forming apparatuses and the terminal apparatus 1, and other data, are stored in appropriate Boxes 251, according to user operation.

The printer 26 prints out image data read out from a document by the scanner 24, print data received from the terminal apparatus 1 and other data, by a specified mode.

The operation panel 27 serves for various entry operations and etc., and includes a display 271 that is a liquid crystal display or etc., and a key entry portion 272 having a numeric key pad, a start key, a stop key and other keys.

The network controller 28 controls communication with the terminal apparatus 1 and the other MFPs, via the network 3.

Hereinafter, operations of the image forming system shown in FIG. 1 will be explained with reference to a Figure.

Figure 5:
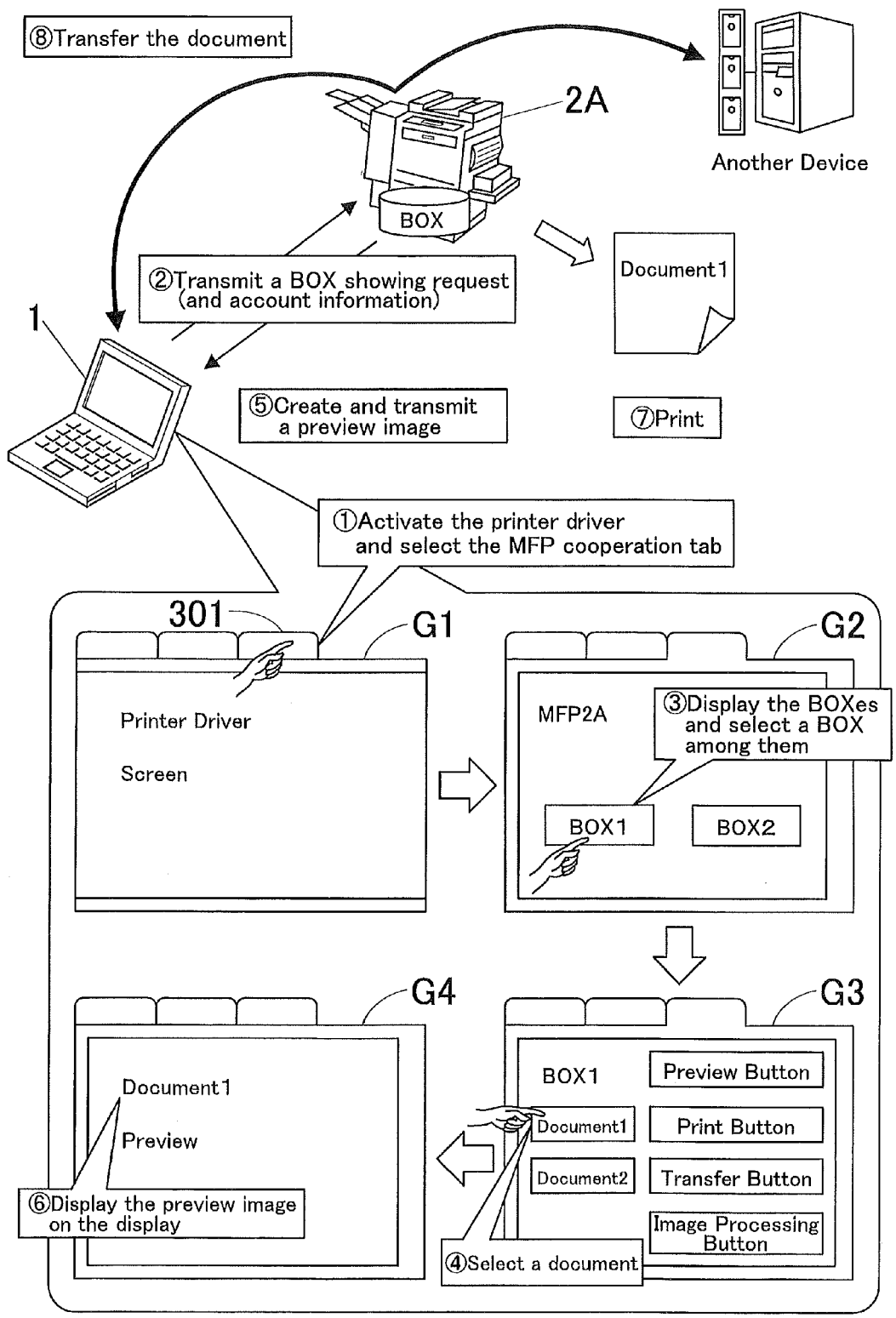
FIG. 5 is a view to explain a first example of operations of the image forming system.

FIG. 5 is a view to explain a first example of the operations.

A user activates a printer driver for the MFP 2A on the terminal apparatus 1. Then, according to the GUI 187 of the printer driver, a print setting screen G1 that is an operation setting screen according to this embodiment is displayed on the display 16. In addition to a print setting area of the printer driver, a condition setting area for specifying number of sets, target page, whether or not to give page number and others; an OK button; a cancel button; a detail setting tab; a MFP cooperation tab 301; and others are shown in the print setting screen G1.

The user selects the MFP cooperation tab 301 (Circled Number 1 of FIG. 5), then a BOX showing request is transmitted to the printer driver's matching MFP 2A (Circled Number 2). If authentication is required for a user trying to log in the MFP 2A, this user's account information held by the printer driver or entered by the user via an account information entry screen that is displayed separately, is transmitted to the MFP 2A, and a BOX showing request is transmitted thereto after authentication succeeds.

Receiving a BOX showing request, the MFP 2A returns thereto, a list of the Boxes 205 recorded in the memory 25 and a list of the documents stored in the respective Boxes 205, as reference information, so that the user could select a document among them.

Receiving a list of the Boxes 205 and a list of the documents stored in the respective Boxes 205, the terminal apparatus 1 displays a BOX selection screen G2 on the display 16 (Circled Number 3). And the user selects a BOX among the list, then the screen is switched to a screen G3 in which a list of the documents stored in the selected BOX and the instruction buttons: a preview button, a print button, a transfer button and an image processing button, are shown.

Subsequently, the user further selects a preferable document among the list and presses an instruction button (Circled Number 4). Then, a request to execute processing as instructed is transmitted to the MFP 2A, and in response to the request, the MFP 2A executes processing accordingly.

For example, if the user selects a Document 1 and presses a preview button, a request to show a preview image is transmitted to the MFP 2A, and in response to the request, the MFP 2A creates a preview image of the Document 1 and returns it to the terminal apparatus 1 (Circled Number 5).

Receiving the preview image from the MFP 2A, the terminal apparatus 1 displays it on the display 16 (Circled Number 6).

Meanwhile, if the user selects a document and presses a print button, a request to print the selected document is transmitted to the MFP 2A, and in response to the request, the MFP 2A prints the document (Circled Number 7).

Meanwhile, if the user selects a document and presses a transfer button, a screen for entry of a destination address and a transfer method is displayed, which is not illustrated in Figures. When the user specifies a destination address and a transfer method, a request to transfer the selected document is transmitted to the MFP 2A, and in response to the request, the MFP 2A transfers the document to the specified destination address by the specified transfer method (Circled Number 8). The transfer method may be electronic mail, FTP, SMB, HTTP, Web Dab, G3-FAX, PC-FAX, SIP-FAX or etc.

Meanwhile, if the user selects a document and presses an image processing button, a screen for entry of an image processing method available for the MFP 2 is displayed, which is not illustrated in Figures. When the user specifies an image processing method, a request to perform image processing on the selected document is transmitted to the MFP 2A, and in response to the request, the MFP 2A performs image processing on the document by the specified image processing method. The image processing method may be, for example, format conversion, embedment of ground pattern information or etc.

As described above, users can view the documents stored in a BOX of the MFP 2A in a very simple manner, without the need for specific knowledge or experience, by giving a showing request via a print setting screen that is displayed on the terminal apparatus 1 according to their familiar printer driver. Thus, user operability could be improved very much.

Furthermore, since instruction portions to give instructions to preview, print, transfer and perform image processing on a document selected via a document selection screen is also shown in a screen displayed according to the printer driver, users can give a preferable instruction among them about the selected document, via the screen.

Users' available instructions among those to preview, print, transfer and perform image processing on a document selected via a document selection screen, may be restricted based on the user authorities to use functions, which are set for the users. That is, instruction buttons of a user's available instructions are shown in the screen for the user (for example, only a preview button is shown for a user who is permitted to preview only). Information of their user authorities to use functions is recorded in the terminal apparatus 1 or in the MFP 2.

Figure 6:
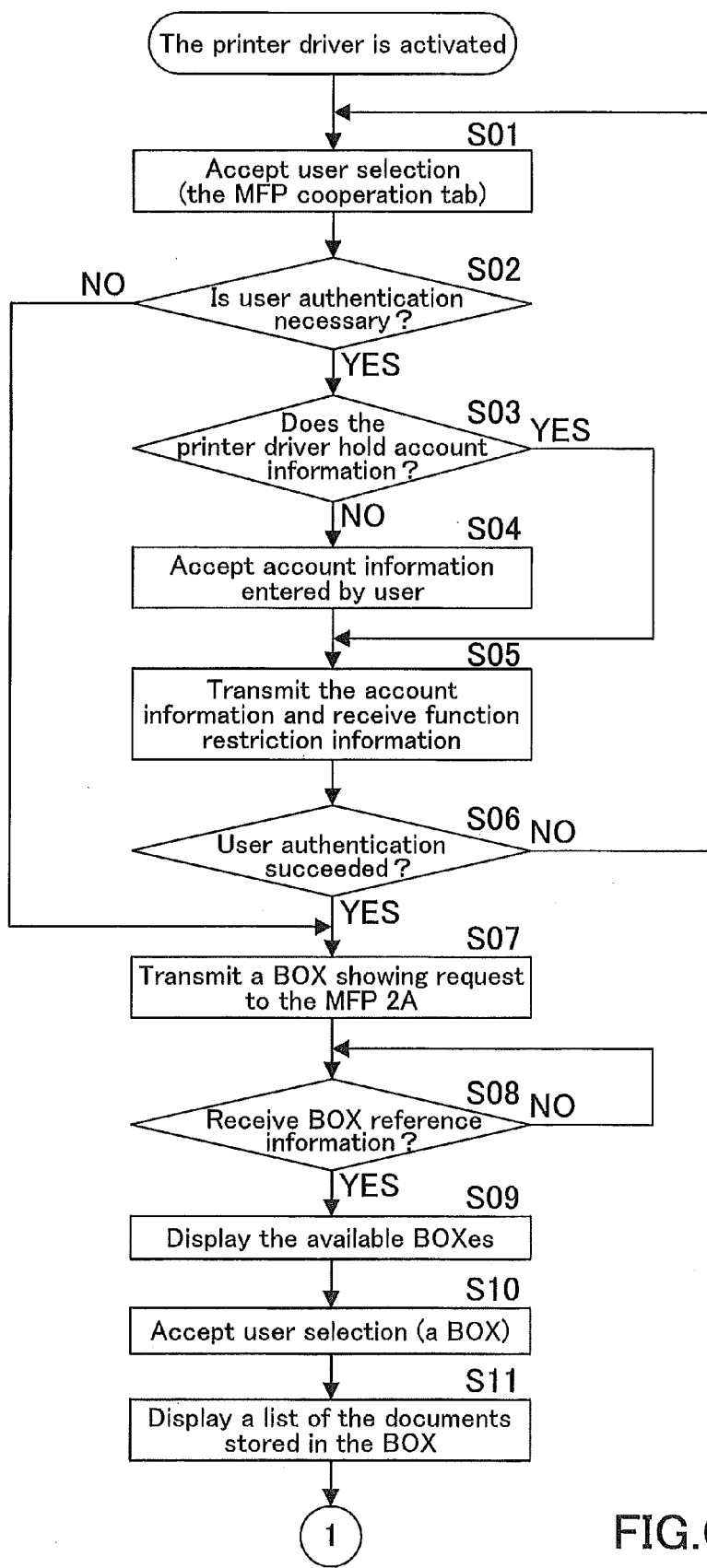
FIG. 6 is a flowchart representing a procedure executed in the terminal apparatus of the image forming system shown in FIG. 5.
Figure 7:
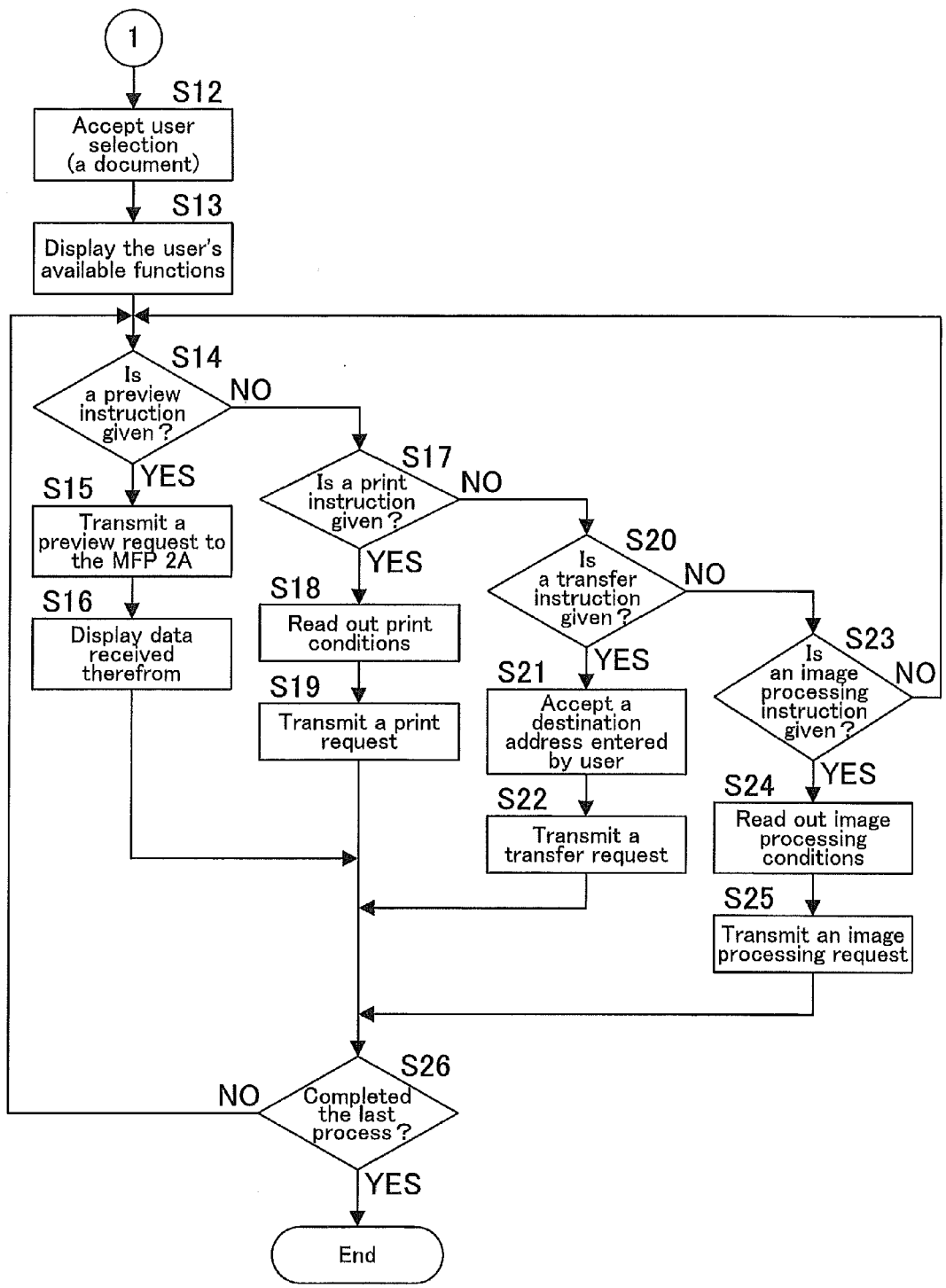
FIG. 7 is a flowchart continued from that of FIG. 6.

FIG. 6 and FIG. 7 show a flowchart representing a procedure executed in the terminal apparatus 1 of the image forming system shown in FIG. 5. This procedure and the procedures represented by the flowcharts in FIG. 9 and the following Figures are executed by the CPU 11 of the terminal apparatus 1 according to a printer driver recorded in a recording medium such as the memory 14.

A user activates a printer driver for the MFP 2A, then according to the printer driver, a print setting screen is displayed on the display 16.

And the user selects the MFP cooperation tab 301 via the print setting screen. Then, this selection is accepted in Step S01, and it is judged in Step 502, whether or not user authentication is necessary or not.

If user authentication is not necessary (NO in Step S02), the routine proceeds to Step S07. If user authentication is necessary (YES in Step S02) and if the printer driver holds account information (YES in Step S03), then the routine proceeds to Step S05. If the printer driver does not hold account information (NO in Step S03), account information entered by the user is accepted in Step S04. After that, the routine proceeds to Step S05.

In Step S05, the account information is transmitted to the MFP 2A and function restriction information of this user, stored in the MFP 2A, is obtained from the MFP 2A.

Subsequently, it is judged in Step S06, whether or not user authentication succeeded. If user authentication failed (NO in Step S06), the routine goes back to Step S01. If user authentication succeeded (YES in Step S06), the routine proceeds to Step S07.

In Step S07, a BOX showing request is transmitted to the MFP 2A, and in Step S08, the routine waits until BOX reference information is received from the MFP 2A. If it is received (YES in Step S08), the available Boxes are listed on the display 16 based on the BOX reference information, in Step S09.

The user selects a BOX among those listed on the display. Then, this selection is accepted in Step S10, and a list of the documents stored in the selected BOX is displayed based on the BOX reference information, in Step S11.

The user further selects a document among the list displayed on the display, then this selection is accepted in Step S12. Subsequently in Step S13, only instruction buttons of this user's available functions are displayed based on the function restriction information obtained in Step S05, and the routine waits until the user presses any of the instruction buttons.

In Step S14, it is judged whether or not a preview button is pressed. If it is pressed (YES in Step S14), a request to send a preview image is transmitted to the MFP 2A in Step S15. Then, a preview image is returned from the MFP 2A and displayed on the display 16, in Step S16. After that, the routine proceeds to Step S26.

If a preview button is not pressed (NO in Step S14), then it is judged in Step S17, whether or not a print button is pressed. If it is pressed (YES in Step S17), print settings entered by the user are read out in Step S18, and a print request is transmitted to the MFP 2A. After that, the routine proceeds to Step S26.

If a print button is not pressed (NO in Step S17), then it is judged in Step S20, whether or not a transfer button is pressed. If it is pressed (YES in Step S20), a destination address entered by the user is read out in Step S21, and a transfer request is transmitted to the MFP 2A. After that, the routine proceeds to Step S26.

If a transfer button is not pressed (NO in Step S20), then it is judged in Step S23, whether or not an image processing button is pressed. If it is pressed (YES in Step S23), image processing conditions entered by the user are read out in Step S24, and an image processing request is transmitted to the MFP 2A in Step S25. If an image processing button is not pressed (NO in Step S23), the routine goes back to Step S14.

In Step S26, it is judged whether or not the last process is completed. If it is not completed (NO in Step S26), the routine goes back to Step S14. If the last process is completed (YES in Step S26), the routine terminates.

Receiving the print request, the transfer request or the image processing request, the MFP 2A prints, transfers or performs image processing on the document selected among those in the BOX according to the conditions entered by the user.

Figure 8:
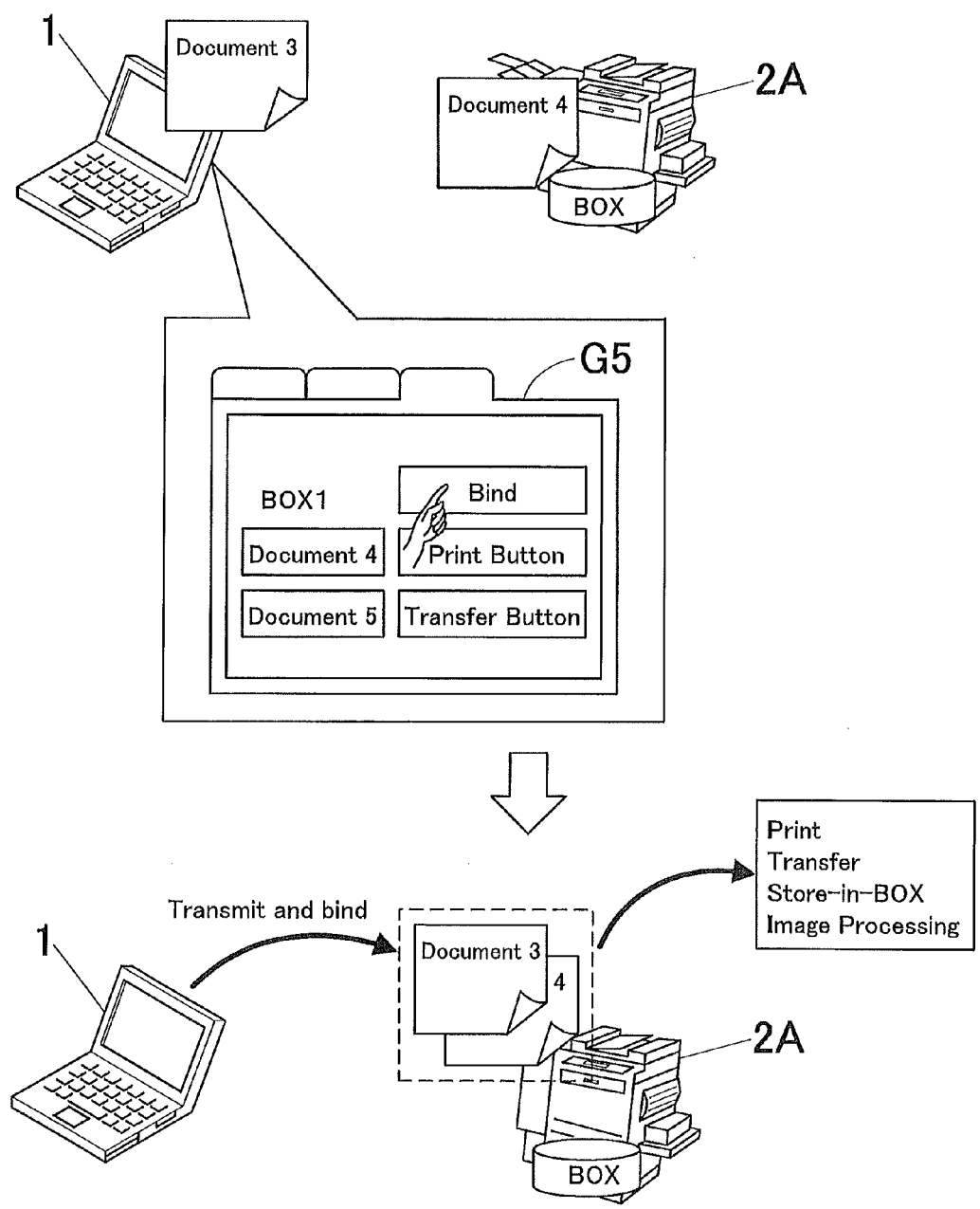
FIG. 8 is a view to explain a second example of operations of the image forming system.

FIG. 8 is a view to explain a second example of operations of the image forming system. In this example, a user can make the MFP 2A merge a document (for example, a Document 3) and the user's selected document among those in a BOX (a Document 4 in FIG. 8), by activating a printer driver while the Document 3 is currently opened on the display 16 using a document view and edit application.

More concretely, after activating a printer driver, a list of the documents stored in a BOX is displayed in a BOX document selection screen G5 based on reference information received from the MFP 2A. Also, a bind button, a print button and a transfer button are displayed in this screen.

A user presses the bind button via the selection screen G5, then the Document 3 stored in the terminal apparatus 1 and a merge request are transmitted to the MFP 2A.

Receiving the Document 3 and a merge request, the MFP 2A merges the Document 3 and the user's selected document that is the Document 4 stored in a Box.

If a user presses the bind button and the print button via the selection screen G5, these documents are bound and printed, meanwhile if a user presses the transfer button and the print button via the selection screen G5, these documents are bound and transferred to a predetermined destination address. Here, if a store-in-Box button is also shown in the screen, the user can store the merged documents in a BOX meanwhile if an image processing button is also shown in the screen, the user can perform image processing on the merged documents.

Figure 9:
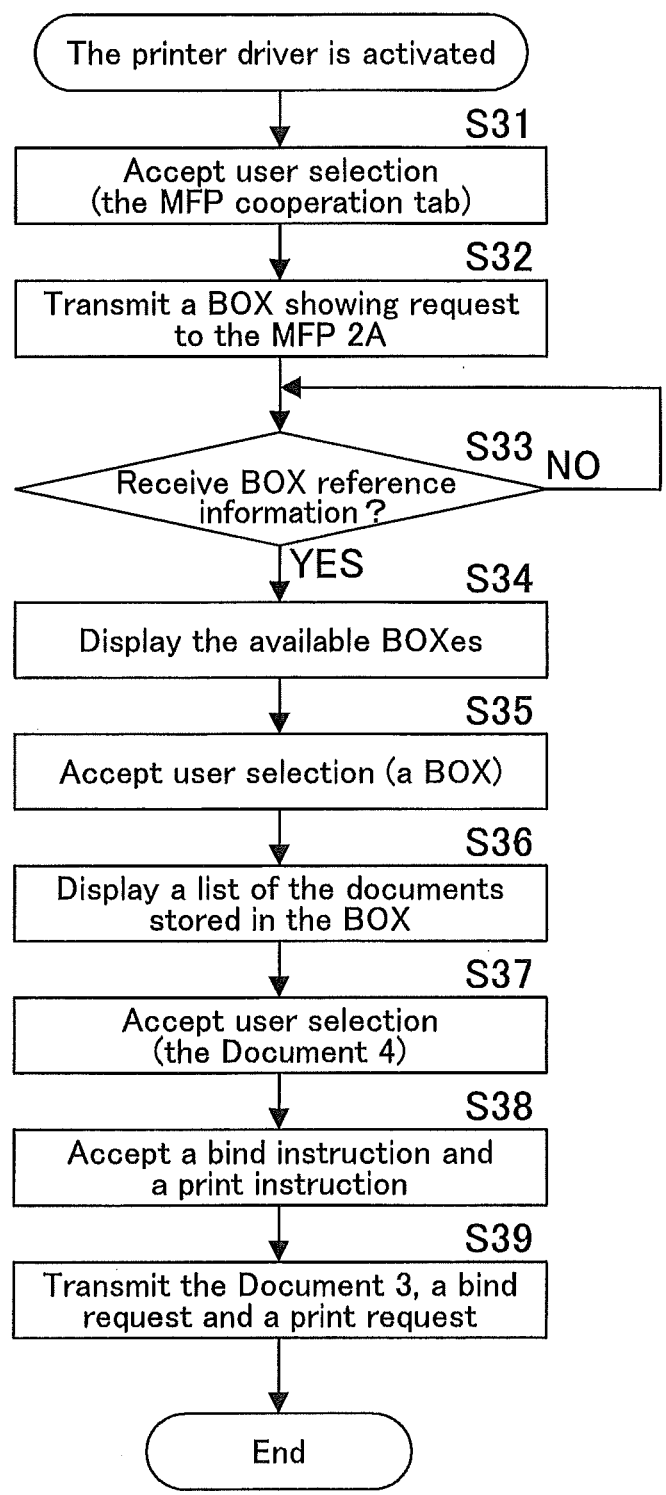
FIG. 9 is a flowchart representing a procedure executed in the terminal apparatus of the image forming system shown in FIG. 8.

FIG. 9 is a flowchart representing a procedure executed in the terminal apparatus 1 of the image forming system shown in FIG. 8.

A user opens the Document 3 stored in the terminal apparatus 1 using a document view and edit application. In this state of things, the user activates a printer driver for the MFP 2A, then a print setting screen is displayed on the display 16.

The user selects the MFP cooperation tab 301 via the print setting screen. Then this selection is accepted in Step S31, and a BOX showing request is transmitted to the MFP 2A in Step S32. The routine waits until BOX reference information is received from the MFP 2A in Step S33. If it is received (YES in Step S33), the available Boxes are listed on the display 16 based on the BOX reference information, in Step S34.

The user selects a BOX among those listed on the display. Then, this selection is accepted in Step S35, and a list of the document stored in the selected BOX is displayed based on the BOX reference information, in Step S36.

The user selects the Document 4 for example, among the list displayed on the display, then this selection is accepted in Step S37. Subsequently, the user presses the bind button and the print button, and this selection is accepted in Step S38. After that, the Document 3, a bind request and a print request are transmitted to the MFP 2A, in Step S39.

Receiving the Document 3, a bind request and a print request, the MFP 2A merges the Document 3 and the selected document that is the Document 4 stored in the BOX and then prints the merged documents.

Figure 10:
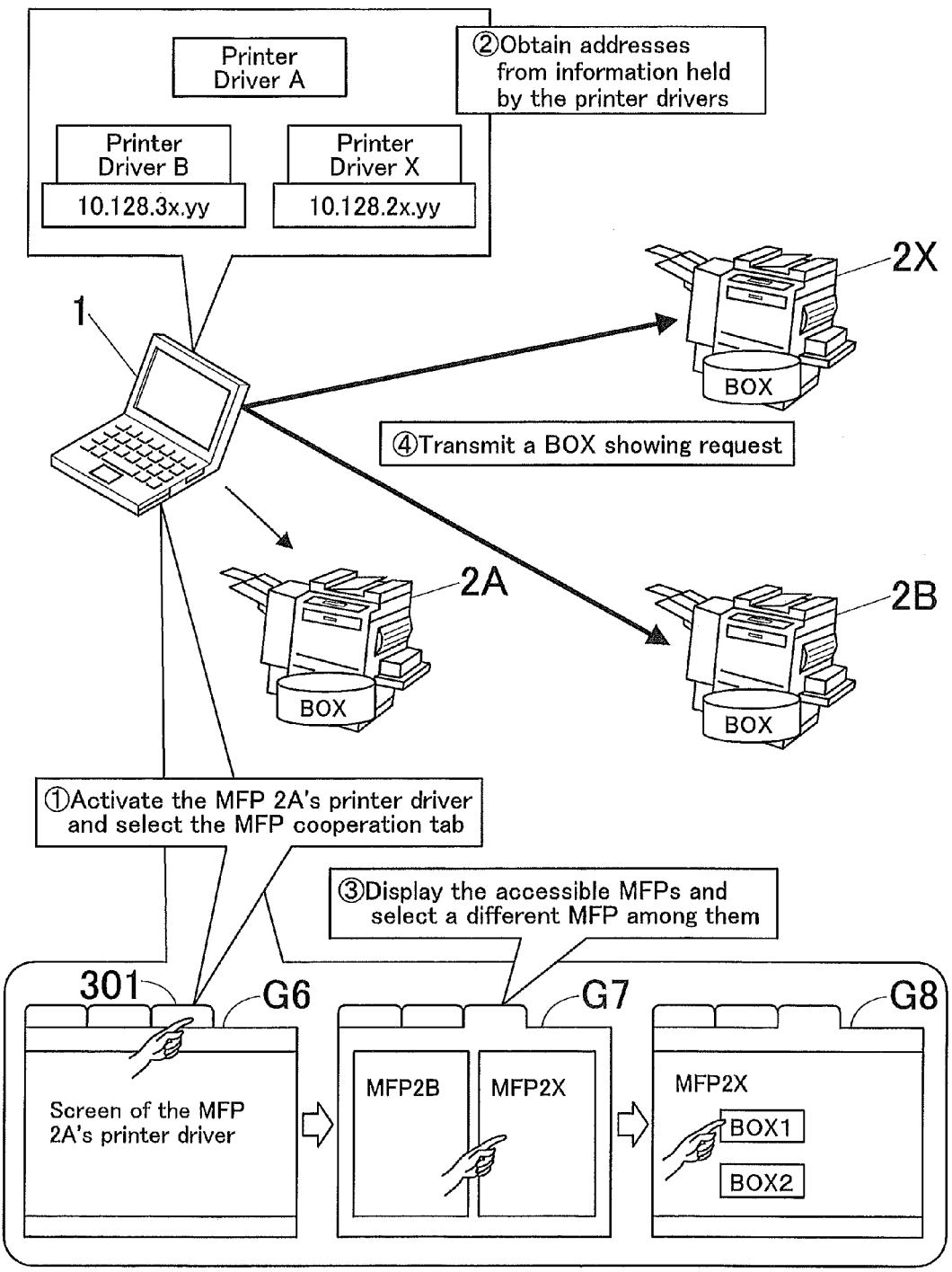
FIG. 10 is a view to explain a third example of operations of the image forming system.

FIG. 10 is a view to explain a third example of operations of the image forming system. In this example, a user can view the documents stored in a BOX of the MFP 2X, using a printer driver for the MFP 2A.

A user activates a printer driver for the MFP 2A on the terminal apparatus 1, then a print setting screen G6 for the MFP 2A is displayed on the display 16. Subsequently, the user selects the MFP cooperation tab 301 via the print setting screen G6 (Circled Number 1 in FIG. 10), then printer drivers recorded in the memory 14, other than the one for the MFP 2A, are detected. And network addresses of the other MFPs, held by the detected printer drivers are obtained (Circled Number 2).

In this example, in addition to the printer driver for the MFP 2A, there exist printer drivers for the MFP 2B and the MFP 2X. Thus, a MFP selection screen G7 in which buttons to select the user's accessible MFPs (the MFP 2A, the MFP 2B and the MFP 2X) are shown, is displayed on the display 16 (Circled Number 3). That is, the buttons to select the MFP 2B and the MFP 2X are also shown in a screen displayed according to the printer driver for the MFP 2A.

The user selects the MFP 2X for example, then a BOX showing request is transmitted to the MFP 2X's network address previously obtained (Circled Number 4).

Receiving a BOX showing request, the MFP 2X returns thereto, a list of the Boxes 251 recorded in the memory 25 and a list of the documents stored in the respective Boxes 251, as reference information, so that the user could select a document among them.

Receiving a list of the Boxes 205 and a list of the documents stored in the respective Boxes 205, the terminal apparatus 1 displays a BOX selection screen G8 on the display 16. And the user selects a BOX among the list, then the screen is switched to another screen in which a list of the documents stored in the selected BOX a preview button and etc. are shown.

Subsequently, the user further selects a preferable document among the list and presses a preview button. Then, a preview request is transmitted to the MFP 2X, and in response to the request, the MFP 2X creates a preview image of the Document 1 and returns it to the terminal apparatus 1. Receiving the preview image from the MFP 2X, the terminal apparatus 1 displays it on the display 16.

As described above, according to this embodiment, users can view the documents stored in a BOX of the MFP 2B and MFP 2X, by giving an instruction via a print setting screen displayed according to a printer driver for the MFP 2A. That is, they do not have to further activate printer drivers for the MFP 2B and the MFP 2X to view the documents stored in a BOX thereof, after activating the printer driver for the MFP 2A, and this could improve user operability. Furthermore, network addresses of the MFP 2B and the MFP 2X can be obtained from their matching printer drivers.

Figure 11:
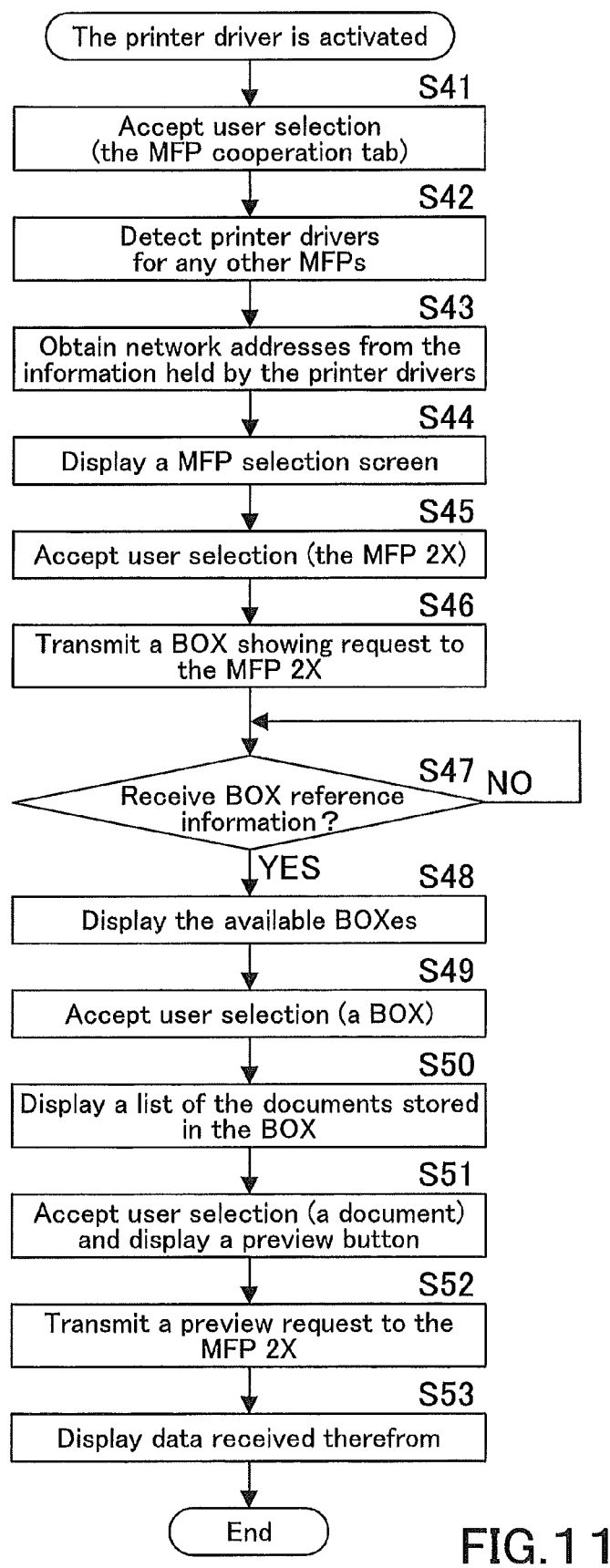
FIG. 11 is a flowchart representing a procedure executed in the terminal apparatus of the image forming system shown in FIG. 10.

FIG. 11 is a flowchart representing a procedure executed in the terminal apparatus 1 of the image forming system shown in FIG. 10.

A user activates a printer driver for the MFP 2A, then according to the printer driver, a print setting screen is displayed on the display 16.

And the user selects the MFP cooperation tab 301 via the print setting screen. Then, this selection is accepted in Step S41, and printer drivers for any MFPs installed on the terminal apparatus 1, other than the MFP 2A, are detected in Step S42. And network addresses of the MFP 2B and MFP 2X, held by the detected printer drivers, are obtained in Step S43.

Subsequently, a selection screen to select a MFP among the user's accessible MFPs is displayed on the display 16, in Step S44. The user selects the MFP 2X, then this selection is accepted in Step S45. After that, a BOX showing request is transmitted to the MFP 2X, in Step S46.

In Step S47, the routine waits until BOX reference information is received from the MFP 2X. If it is received (YES in Step S47), the available Boxes are listed on the display 16 based on the BOX reference information, in Step S48.

The user selects a BOX among those listed on the display. Then this selection is accepted in Step S49, and a list of the documents stored in the selected BOX is displayed based on the BOX reference information, in Step S50.

The user further selects a document among the list displayed on the display. Then this selection is accepted and a preview button is displayed on the display, in Step S51.

And the user presses the preview button. Then, a request to show a preview image is transmitted to the MFP 2X in Step S52, and a preview image is received therefrom and displayed on the display 16 in Step S53.

Figure 12:
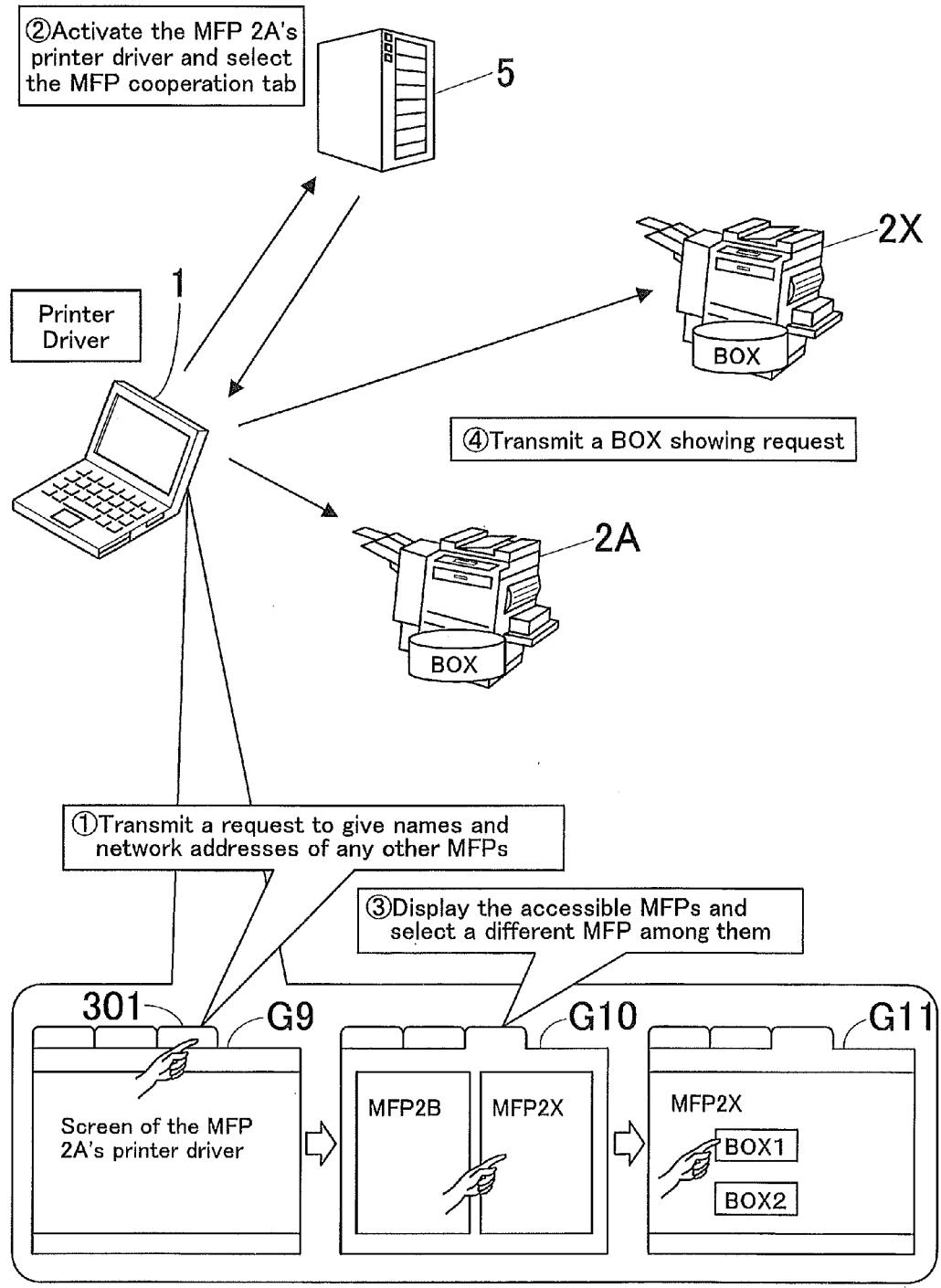
FIG. 12 is a view to explain a fourth example of operations of the image forming system.

FIG. 12 is a view to explain a fourth example of operations of the image forming system. In this example, a user can view the documents stored in a BOX of the MFP 2X, using a printer driver for the MFP 2A just like the third example shown in FIG. 10, but by obtaining names and network addresses of the user's accessible MFPs other than the MFP 2A, externally from the administration server 5.

The administration server 5 records in itself, MFP administration information including names and network addresses of the MFPs owned by a company or a section, each user's account information, each user's authority information to use functions, and other information.

A user activates a printer driver for the MFP 2A on the terminal apparatus 1, then a print setting screen G9 is displayed on the display 16. Subsequently, the user selects the MFP cooperation tab 301 via the print setting screen G9 (Circled Number 1 in FIG. 12), then a request to give names and network addresses of the user's accessible MFPs other than the MFP 2A is transmitted to the administration server 5, and those are received from the administration server 5.

In this example, the user's accessible MFPs other than the MFP 2A are the MFP 2B and the MFP 2X. Thus, a MFP selection screen G10 in which buttons to select the user's accessible MFPs are shown, is displayed on the display 16 (Circled Number 3). That is, the buttons to select the MFP 2B and the MFP 2X are also shown in a screen displayed according to the printer driver for the MFP 2A.

The user selects the MFP 2X for example, then a BOX showing request is transmitted to the MFP 2X's network address obtained from the administration server 5 (Circled Number 4).

Receiving a BOX showing request, the MFP 2X returns thereto, a list of the Boxes 251 recorded in the memory 25 and a list of the documents stored in the respective Boxes 251, as reference information, so that the user could select a document among them.

Receiving a list of the Boxes 205 and a list of the documents stored in the respective Boxes 205, the terminal apparatus 1 displays a BOX selection screen G11 on the display 16. And the user selects a BOX among the list, then the screen is switched to another screen in which a list of the documents stored in the selected BOX a preview button and etc. are shown.

Subsequently, the user further selects a preferable document among the list and presses a preview button. Then, a preview request is transmitted to the MFP 2X, and in response to the request, the MFP 2X creates a preview image of the Document 1 and returns it to the terminal apparatus 1. Receiving the preview image from the MFP 2X, the terminal apparatus 1 displays it on the display 16.

As described above, according to this embodiment, users can view the documents stored in a BOX of the MFP 2B and the MFP 2X, by giving an instruction via a print setting screen displayed according to a printer driver for the MFP 2A. That is, they do not have to further activate printer drivers for the MFP 2B and the MFP 2X to view the documents stored in a BOX thereof, after activating the printer driver for the MFP 2A. This could improve user operability. Furthermore, even if printer drivers for the users' accessible MFP 2B and the MFP 2X, other than the MFP 2A, are not installed on the terminal apparatus 1, they can access the documents stored in a BOX of the MFP 2B and the MFP 2X, by obtaining names and network addresses of the MFP 2B and the MFP 2X from the external server 5.

Figure 13:
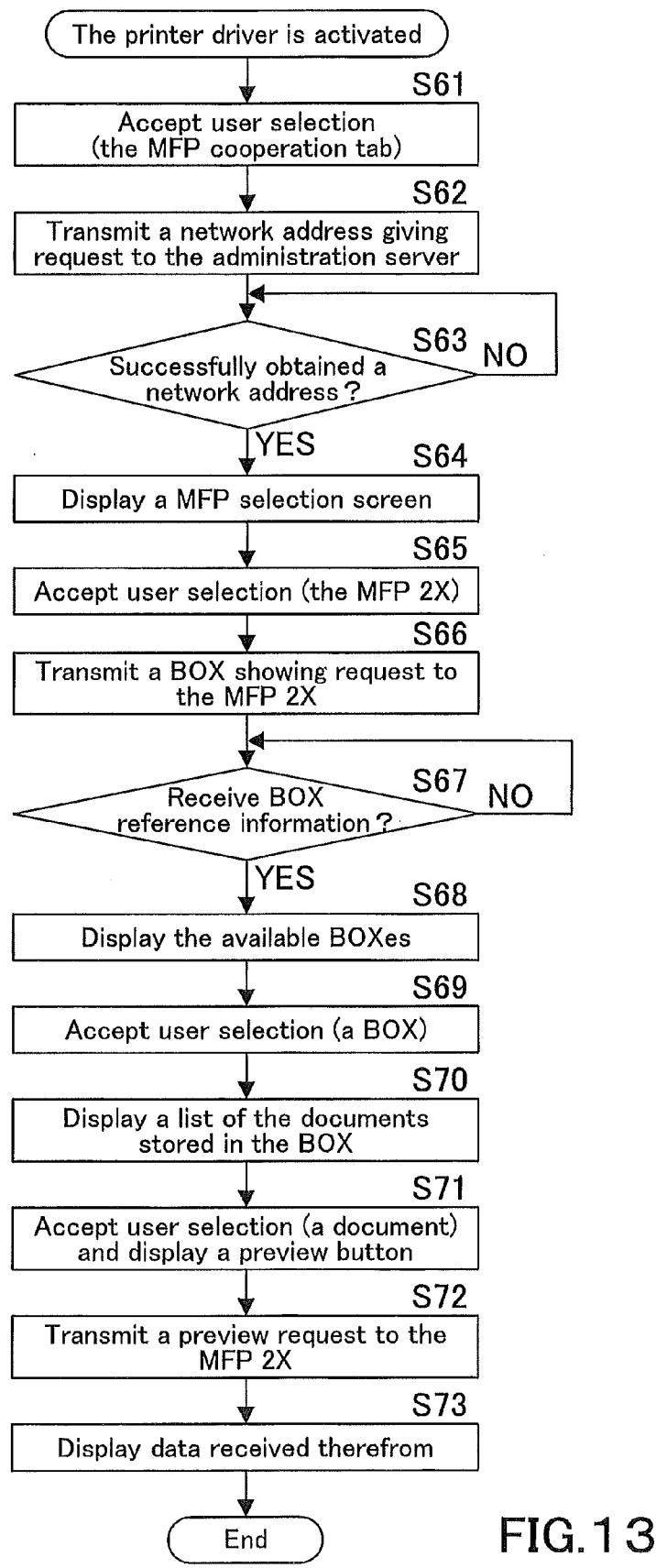
FIG. 13 is a flowchart representing a procedure executed in the terminal apparatus of the image forming system shown in FIG. 12.

FIG. 13 is a flowchart representing a procedure executed in the terminal apparatus 1 of the image forming system shown in FIG. 12.

A user activates a printer driver for the MFP 2A, then according to the printer driver, a print setting screen is displayed on the display 16.

And the user selects the MFP cooperation tab 301 via the print setting screen. Then, this selection is accepted in Step S61, and a request to give names and network addresses of the accessible MFPs is transmitted to the administration server 5, in Step S62.

Subsequently, it is judged in Step S63, whether or not names and network addresses of the accessible MFPs are successfully obtained. If those are not obtained (NO in Step S63), the routine waits until those are obtained. If those are obtained (YES in Step S63), a selection screen to select a MFP among the user's accessible MFPs including the MFP 2B and the MFP 2X is displayed on the display 16, in Step S64. The user selects the MFP 2X, then this selection is accepted in Step S65. After that, a BOX showing request is transmitted to the MFP 2X, in Step S66.

In Step S67, the routine waits until BOX reference information is received from the MFP 2X. If it is received (YES in Step S67), the available Boxes are listed on the display 16 based on the BOX reference information, in Step S68.

The user selects a BOX among those listed on the display. Then this selection is accepted in Step S69, and a list of the documents stored in the selected BOX is displayed based on the BOX reference information, in Step S70.

Subsequently, the user further selects a document among the list displayed on the display. Then this selection is accepted and a preview button is displayed on the display, in Step S71.

And the user presses the preview button. Then, a request to show a preview image is transmitted to the MFP 2X in Step S72, and a preview image is received therefrom and displayed on the display 16 in Step S73.

Figure 14:
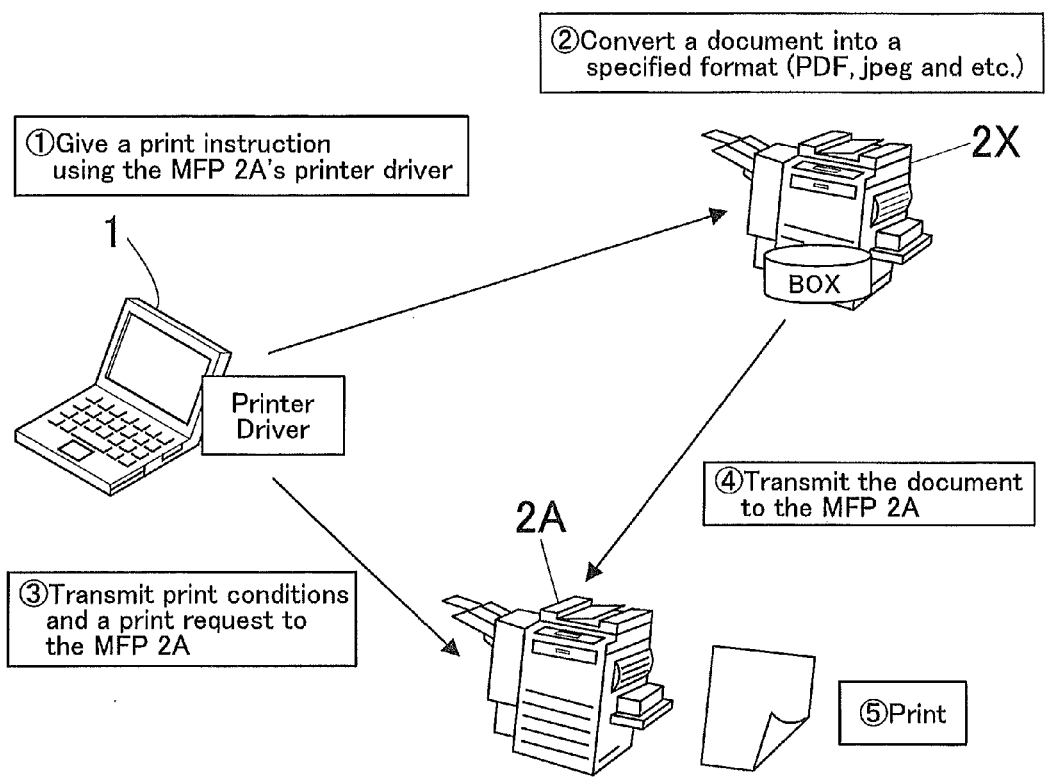
FIG. 14 is a view to explain a fifth example of operations of the image forming system.

FIG. 14 is a view to explain a fifth example of operations of the image forming system. In this example, a user can view the documents stored in a BOX of the MFP 2X and make the MFP 2A print a document selected among them, using a printer driver for the MFP 2A.

If the MFP 2A has a function for printing even a document that is not created as print information described in Page Description Language for example, using the printer driver, in other words, the MFP 2A has the PDF (Portable Document Format) direct printing function, and the MFP 2X has the function of converting a document to PDF, then the MFP 2X can transmit a document directly to the MFP 2A to make it print the document. Meanwhile, it is required to enter print settings such as number of sets and paper size using the printer driver for the MFP 2A and transmit the print settings to the MFP 2A using this printer driver to apply them to printing.

The operations specifically from activating a printer driver for the MFP 2A on the terminal apparatus 1 until displaying on the display 16 a document selection screen in which a list of the documents stored in the MFP 2X is shown, is the same as those of the image forming system, explained in FIG. 10.

The user selects a document via the document selection screen, and enters print settings and gives a print instruction to the MFP 2A via the print setting screen displayed according to the printer driver for the MFP 2A (Circled Number 1 in FIG. 14). And the user gives to the MFP 2X, an instruction to convert the selected document into a specified format such as PDF or JPEG (Joint Photographic Experts Group). Accepting the format conversion instruction, the MFP 2X converts the document to the specified format (Circled Number 2).

The terminal apparatus 1 transmits the print settings and a print request to the MFP 2A (Circled Number 3). Meanwhile, after converting the document into the specified format, the MFP 2X transmits the document in the specified format is transmitted to the MFP 2A (Circled Number 4).

Receiving the document from the MFP 2X, the MFP 2A prints it according to the print settings received from the terminal apparatus 1 (Circled Number 5).

As described above, users can make the MFP 2A print a document among those stored in a BOX of the MFP 2X, by giving an instruction via a print setting screen displayed according to a printer driver for the MFP 2A, activated on the terminal apparatus 1.

Figure 15:
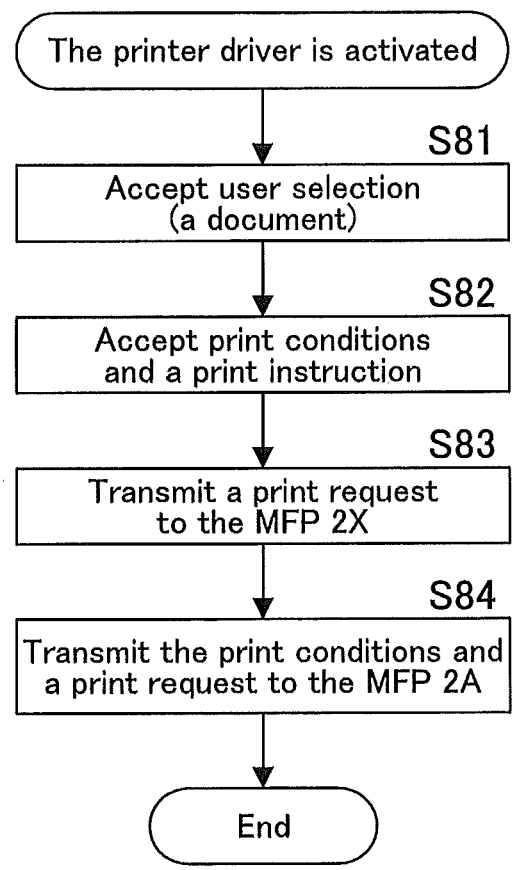
FIG. 15 is a flowchart representing a procedure executed in the terminal apparatus of the image forming system shown in FIG. 14.

FIG. 15 is a flowchart representing a procedure executed in the terminal apparatus 1 of the image forming system shown in FIG. 14.

The procedure specifically from activating a printer driver for the MFP 2A until displaying a document selection screen is the same as Steps S41 through S50 of the procedure explained with FIG. 11.

The user selects a document via the document selection screen. Then this selection is accepted in Step S81, and print settings and a print instruction entered and given by the user are accepted in Step S82.

Then, a request to convert the selected document into a specified format is transmitted to the MFP 2X in Step S83, and the print settings and the print instruction are transmitted to the MFP 2A in Step S84.

Receiving the document from the MFP 2X, the MFP 2A prints it according to the print settings received from the terminal apparatus 1.

Figure 16:
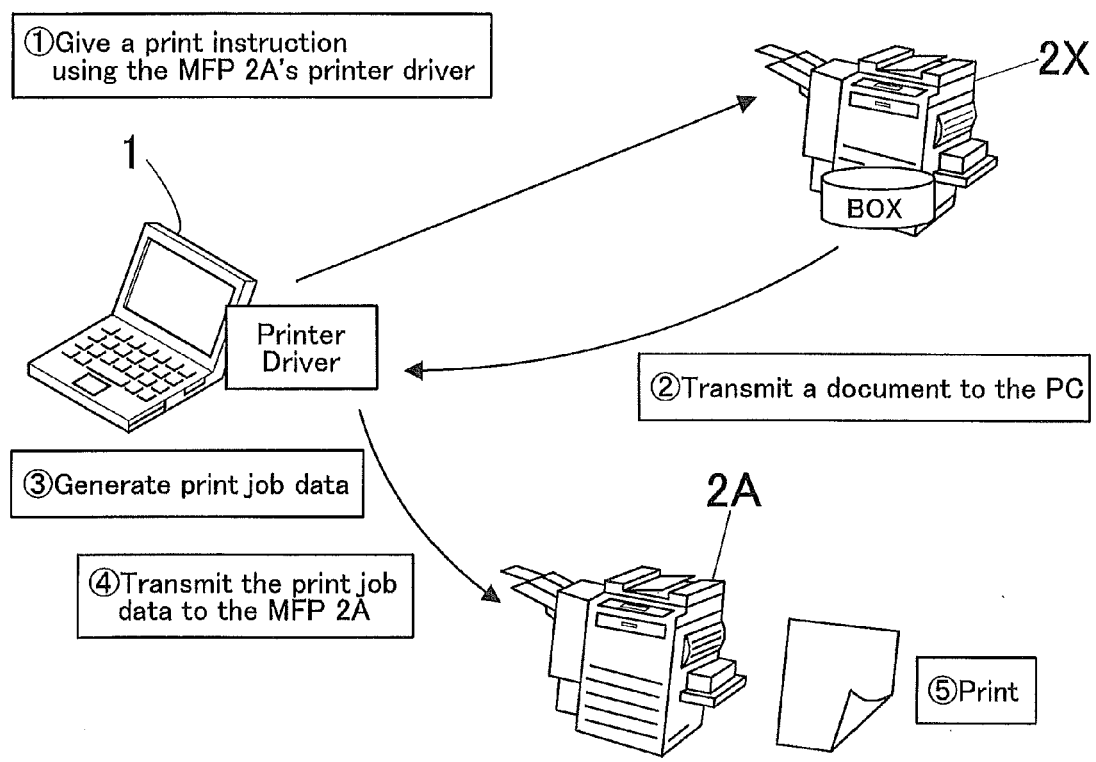
FIG. 16 is a view to explain a sixth example of operations of the image forming system.

FIG. 16 is a view to explain a sixth example of operations of the image forming system. In this example, a user can view the documents stored in a BOX of the MFP 2X and make the MFP 2A print a document selected among them, using a printer driver for the MFP 2A just like the image forming system explained with FIG. 14, but by downloading the document from the MFP 2X onto the terminal apparatus 1 and transmitting it to the MFP 2A as print job data.

The operations specifically from a user's activating a printer driver for the MFP 2A on the terminal apparatus 1 until displaying on the display 16 a document selection screen in which a list of the documents stored in the MFP 2X is shown, is the same as those of the image forming system, explained with FIG. 12.

The user selects a document via the document selection screen, and enters print settings and give a print instruction via a print setting screen displayed according to a printer driver for the MFP 2A (Circled Number 1 in FIG. 16). Then, a request to allow downloading the selected document is transmitted to the MFP 2X, and in response to the request, the MFP 2X returns it to the terminal apparatus 1 (Circled Number 2).

The printer driver installed on the terminal apparatus 1 generates a print job constructed of the print settings entered by the user and the document downloaded from the MFP 2X (Circled Number 3), and transmits the print job to the MFP 2A (Circled Number 4). Receiving the print job, the MFP 2A executes the print job.

As described above, users can make the MFP 2A print a document among those stored in a BOX of the MFP 2X, by giving an instruction via a print setting screen displayed according to a printer driver for the MFP 2A, activated on the terminal apparatus 1.

Figure 17:
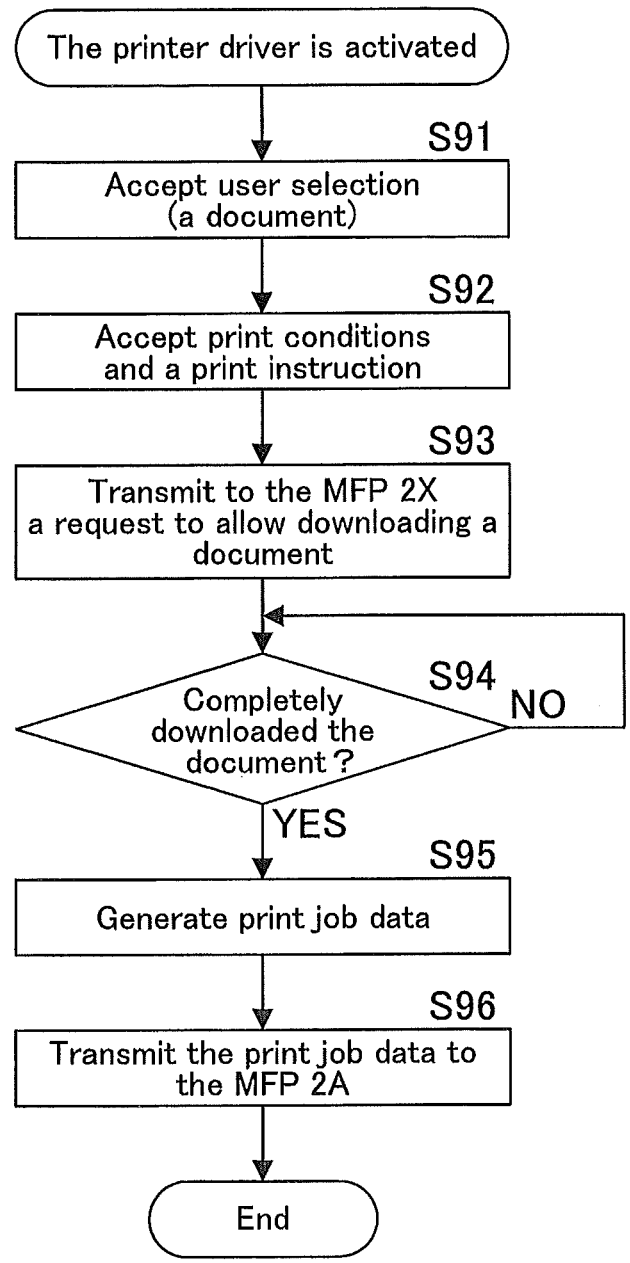
FIG. 17 is a flowchart representing a procedure executed in the terminal apparatus 1 of the image forming system shown in FIG. 16.

FIG. 17 is a flowchart representing a procedure executed in the terminal apparatus 1 of the image forming system shown in FIG. 16.

The procedure specifically from activating a printer driver for the MFP 2A until displaying a document selection screen is the same as Steps S41 through S50 of the procedure explained in FIG. 11.

The user selects a document via the document selection screen. Then this selection is accepted in Step S91, and print settings and a print instruction entered and given by the user are also accepted in Step S92.

Then, a request to allow downloading the selected document is transmitted to the MFP 2X in Step S93, and the routine waits until the document is completely downloaded therefrom in Step S94.

If the document is completely downloaded (YES in Step S94), a print job to print the downloaded document is generated in Step S95, and the generated print job is transmitted to the MFP 2A in Step S96. And the MFP 2A executes the print job received from the terminal apparatus 1.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming system comprising an information processing apparatus and an image forming apparatus that are configured to be interconnected via a network, wherein:

the information processing apparatus comprises:
a memory that records in itself, a printer driver to configure operation setting for an image forming apparatus that holds one or more than one memory area capable of storing a document;
a display;
a controller that makes the display show a setting screen to specify operation settings for the image forming apparatus that matches the printer driver recorded in the memory, when the printer driver is activated, and further makes the display show in the setting screen, an instruction portion to give an instruction to show the documents stored in a memory area of the image forming apparatus; and
a transmitter that transmits a request to show the documents stored therein to the image forming apparatus, when the instruction portion is used by a user, the image forming apparatus comprises:
a receiver that receives the request from the information processing apparatus;
a transmitter that transmits to the information processing apparatus, reference information to select a document among those stored therein, in response to the request received by the receiver,
the controller of the information processing apparatus further makes the display show a selection screen to select a document among those stored therein based on the reference information received from the image forming apparatus;
wherein the printer driver is configured to hold the authentication information; and
wherein the transmitter of the information processing apparatus further transmits to the image forming apparatus, a first document and a request to merge the first document and a second document, if the setting screen is displayed by activating the printer driver while the first document is displayed on the display, then the second document is selected via the selection screen displayed by transmitting the request to the image forming apparatus.

2. The image forming system recited in claim 1, wherein:
the controller of the information processing apparatus further makes the display show an instruction portion to give an instruction to the image forming apparatus to print a document selected via the selection screen, according to the printer driver.

3. The image forming system recited in claim 1, wherein:
the controller of the information processing apparatus further makes the display show an instruction portion to give an instruction to the image forming apparatus to transfer a document selected via the selection screen, according to the printer driver.

4. The image forming system recited in claim 1, wherein:
the controller of the information processing apparatus further makes the display show an instruction portion to give an instruction to the image forming apparatus to perform image processing using an image processor of the image forming apparatus on a document selected via the selection screen, according to the printer driver.

5. The image forming system recited in claim 1, wherein:
the controller of the information processing apparatus further makes the display show an entry screen to enter authentication information before the request is transmitted, and the transmitter of the information processing apparatus further transmits the authentication information entered via the entry screen, to the image forming apparatus.

6. The image forming system recited in claim 1, wherein:
the transmitter of the information processing apparatus further transmits to the image forming apparatus authentication information preliminarily entered by user, without displaying the entry screen to enter authentication information, if a printer driver holds the authentication information.

7. The image forming system recited in claim 1, wherein:
the information processing apparatus further comprises a restrictor that restricts a user's available instructions about a document selected via the selection screen, based on the user's authority to use functions.

8. The image forming system recited in claim 1, wherein:
the controller of the information processing apparatus further makes the display show an instruction portion to give an instruction to show the documents stored in a memory area of an image forming apparatuses different from the printer driver's matching image forming apparatus, according to the printer driver.

9. The image forming system recited in claim 8, wherein:
the information processing apparatus further comprises an obtainer that obtains the different image forming apparatus's network address;
the transmitter of the information processing apparatus further transmits a request to show the documents stored in a memory area of the different image forming apparatus, to the obtained network address; and
the controller of the information processing apparatus further makes the display show a selection screen to select a document among those stored in the memory area, based on reference information returned from the different image forming apparatus in response to the request.

10. The image forming system recited in claim 9, wherein:
the obtainer of the information processing apparatus obtains the different image forming apparatus's network address from a printer driver for the different image forming apparatus, installed on the information processing apparatus.

11. The image forming system recited in claim 9, wherein:
the obtainer of the information processing apparatus obtains the different image forming apparatus's network address from an external device that administers network addresses.

12. The image forming system recited in claim 9, wherein:
the controller of the information processing apparatus further makes the display show an instruction portion to give to a currently activated printer driver's matching image forming apparatus, an instruction to print a document stored in a memory area of the different image forming apparatus, selected via the selection screen, according to the printer driver.

13. An information processing apparatus configured to be connected to an image forming apparatus via a network, comprising:
a memory that records in itself, a printer driver to configure operation setting for an image forming apparatus that holds one or more than one memory area capable of storing a document;
a display;
a controller that makes the display show a setting screen to specify operation settings for the image forming apparatus that matches the printer driver recorded in the memory, when the printer driver is activated, and further makes the display show in the setting screen, an instruction portion to give an instruction to show the documents stored in a memory area of the image forming apparatus;
a transmitter that transmits a request to show the documents stored therein to the image forming apparatus, when the instruction portion is used by user;
a receiver that receives reference information to select a document among those stored therein, which is returned from the image forming apparatus in response to the request,
wherein the controller of the information processing apparatus further makes the display show a selection screen to select a document among those stored therein based on the reference information received from the image forming apparatus;
wherein the printer driver is configured to hold authentication information; and
when the setting screen is displayed by activating the printer driver while a first document is displayed on the display of the information processing apparatus and when a second document is then selected via the selection screen displayed in response to the request to show the documents stored in the image forming apparatus, the transmitter of the information processing apparatus transmits to the image forming apparatus the first document and a request to merge the first document and the second document.

14. A document processing method implemented by an image forming system in which an information processing apparatus and an image forming apparatus are configured to interconnected via a network, comprising:
the information processing apparatus's:
making a display show a setting screen to specify operation settings for an image forming apparatus that holds one or more than one memory area capable of storing a document, when a printer driver for the image forming apparatus is activated, and further making the display show in the setting screen, an instruction portion to give an instruction to show the documents stored in a memory area of the image forming apparatus;
transmitting a request to show the documents stored therein to the image forming apparatus, when the instruction portion is used by user, and
the image forming apparatus's:
receiving the request from the information processing apparatus;
transmitting to the information processing apparatus, reference information to select a document among those stored therein, in response to the received request,
wherein a selection screen to select a document among those stored therein is further displayed on the display based on the reference information received from the image forming apparatus;
wherein the printer driver is configured to hold authentication information; and
when the setting screen is displayed by activating the printer driver while a first document is displayed on the display of the information processing apparatus and when a second document is then selected via the selection screen displayed in response to the request to show the documents stored in the image forming apparatus, the information processing apparatus transmits to the image forming apparatus the first document and a request to merge the first document and the second document.

15. A printer driver to configure operation setting for an image forming apparatus that holds one or more than one memory area capable of storing a document, recorded in a non-transitory computer readable recording medium to make a computer of an information processing apparatus, execute:

making a display show a setting screen to specify operation settings and further making the display show in the setting screen, an instruction portion to give an instruction to show the documents stored in a memory area of the image forming apparatus;

transmitting a request to show the documents stored therein to the image forming apparatus, when the instruction portion is used by user;

receiving reference information to select a document among those stored therein, returned from the image forming apparatus in response to the request;

making the display show a selection screen to select a document among those stored therein based on the received reference information;

holding authentication information; and transmitting to the image forming apparatus, a first document and a request to merge the first document and a second document, if the setting screen is displayed by activating the printer driver while the first document is displayed on the display, then the second document is selected via the selection screen displayed by transmitting the request to the image forming apparatus.

16. The printer driver recited in claim 15, recorded in a non-transitory computer readable recording medium to further make a computer of the information processing apparatus execute:

making the display show an instruction portion to give an instruction to the image forming apparatus to print a document selected via the selection screen.

17. The printer driver recited in claim 15, recorded in a non-transitory computer readable recording medium to further make a computer of the information processing apparatus execute:

making the display show an instruction portion to give an instruction to the image forming apparatus to transfer a document selected via the selection screen.

18. The printer driver recited in claim 15, recorded in a non-transitory computer readable recording medium to further make a computer of the information processing apparatus execute:

making the display show an instruction portion to give an instruction to the image forming apparatus to perform image processing using an image processor of the image forming apparatus on a document selected via the selection screen.

19. The printer driver recited in claim 15, recorded in a non-transitory computer readable recording medium to further make a computer of the information processing apparatus execute:

making the display show an entry screen to enter authentication information before the request is transmitted, and transmitting the authentication information entered via the entry screen, to the image forming apparatus.

20. The printer driver recited in claim 15, recorded in a non-transitory computer readable recording medium to further make a computer of the information processing apparatus execute:

transmitting to the image forming apparatus authentication information preliminarily entered by user, without displaying the entry screen to enter authentication information, if the printer driver holds the authentication information.

21. The printer driver recited in claim 15, recorded in a non-transitory computer readable recording medium to further make a computer of the information processing apparatus execute:

restricting a user's available instructions about a document selected via the selection screen, based on the user's authority to use functions.

22. The printer driver recited in claim 15, recorded in a non-transitory computer readable recording medium to further make a computer of the information processing apparatus execute:

making the display show an instruction portion to give an instruction to show the documents stored in a memory area of an image forming apparatus different from the printer driver's matching image forming apparatus.

23. The printer driver recited in claim 15, recorded in a non-transitory computer readable recording medium to further make a computer of the information processing apparatus execute:

obtaining the different image forming apparatus's network address;

transmitting a request to show the documents stored in a memory area of the different image forming apparatus, to the obtained network address; and making the display show a selection screen to select a document among those stored in the memory area, based on reference information returned from the different image forming apparatus in response to the request.

24. The printer driver recited in claim 23, wherein:

obtaining the different image forming apparatus's network address from a printer driver for the different image forming apparatus, installed on the information processing apparatus.

25. The printer driver recited in claim 23, wherein:

obtaining the different image forming apparatus's network address from an external device that administers network addresses.

26. The printer driver recited in claim 23, recorded in a non-transitory computer readable recording medium to further make a computer of the information processing apparatus execute:

making the display show an instruction portion to give to the printer driver's matching image forming apparatus, an instruction to print a document stored in a memory area of the different image forming apparatus, selected via the selection screen.

* * * * *